(12) United States Patent
Chen et al.

(10) Patent No.: US 11,314,888 B2
(45) Date of Patent: Apr. 26, 2022

(54) MULTI-KEY, CLOUD-SPECIFIC SECURITY

(71) Applicant: VMware, Inc., Palo Alto, CA (US)

(72) Inventors: Wei Chen, Palo Alto, CA (US); Hongqiang Chen, Shanghai (CN); Jun Sun, Shanghai (CN)

(73) Assignee: VMware, Inc., Palo Alto, CA (US)

(*) Notice: Subject to any disclaimer, the term of this patent is extended or adjusted under 35 U.S.C. 154(b) by 565 days.

(21) Appl. No.: 16/024,456

(22) Filed: Jun. 29, 2018

(65) Prior Publication Data
US 2020/0004983 A1    Jan. 2, 2020

(51) Int. Cl.
*G06F 21/62* (2013.01)
*H04L 29/06* (2006.01)
*H04L 9/08* (2006.01)

(52) U.S. Cl.
CPC ........ *G06F 21/6245* (2013.01); *H04L 9/0819* (2013.01); *H04L 9/0861* (2013.01); *H04L 63/0428* (2013.01); *H04L 63/12* (2013.01)

(58) Field of Classification Search
CPC . G06F 21/6245; H04L 63/0428; H04L 63/12; H04L 9/0861; H04L 9/0819; H04L 2209/76; H04L 9/0825
USPC .......................................................... 726/26
See application file for complete search history.

(56) References Cited

U.S. PATENT DOCUMENTS

| | | | | |
|---|---|---|---|---|
| 2004/0131190 | A1* | 7/2004 | Nobel | H04L 63/0442 380/282 |
| 2008/0022101 | A1* | 1/2008 | Sung | H04L 9/0825 713/171 |
| 2009/0216707 | A1* | 8/2009 | Keohane | G06F 16/1737 |
| 2011/0295999 | A1* | 12/2011 | Ferris | G06F 9/5072 709/224 |
| 2014/0258719 | A1* | 9/2014 | Cidon | G06F 16/182 713/165 |
| 2016/0127347 | A1* | 5/2016 | Childs | G06F 16/168 726/4 |
| 2017/0163429 | A1* | 6/2017 | Stuntebeck | H04L 63/1408 |
| 2018/0165185 | A1* | 6/2018 | Boshev | G06F 11/0793 |
| 2018/0331824 | A1* | 11/2018 | Racz | H04L 9/30 |
| 2018/0351733 | A1* | 12/2018 | Rohel | H04L 67/1097 |
| 2018/0375648 | A1* | 12/2018 | Huang | H04L 9/0662 |
| 2019/0005248 | A1* | 1/2019 | Krishnamurthy | G06F 21/602 |
| 2019/0114623 | A1* | 4/2019 | Wurmfeld | G06Q 20/409 |
| 2019/0171847 | A1* | 6/2019 | Schneider | G06F 3/067 |
| 2019/0229907 | A1* | 7/2019 | Nicolson | H04L 63/168 |
| 2019/0268759 | A1* | 8/2019 | Targali | H04W 8/18 |

(Continued)

*Primary Examiner* — Sanchit K Sarker
(74) *Attorney, Agent, or Firm* — Patterson + Sheridan, LLP (57) ABSTRACT

Techniques disclosed herein encrypt sensitive data being transmitted from one endpoint to another endpoint through intermediary cloud(s) so that the sensitive data is not visible to the intermediary cloud(s). Double data encryption, utilizing public and private key pairs generated at the endpoints, is used to anonymize the sensitive data, while other data transmitted along with the sensitive data remains unencrypted so that intermediary cloud(s) can process the unencrypted data. In a particular embodiment, one of the endpoints is an application running in a first cloud, the other endpoint is a web browser executing a web application, and the intermediary cloud(s) are additional cloud(s) with applications running therein that provide services to the first cloud or coordinate with the application running in the first cloud to provide a service.

18 Claims, 4 Drawing Sheets

(56) References Cited

U.S. PATENT DOCUMENTS

2019/0297495 A1\* 9/2019 Aggarwal ............. H04W 12/06
2020/0004983 A1\* 1/2020 Chen ................... H04L 63/0428
2020/0169384 A1\* 5/2020 Cheon ....................... H04L 9/30

\* cited by examiner

MULTI-KEY, CLOUD-SPECIFIC SECURITY

BACKGROUND

Cloud computing refers to the provisioning of scalable computing resources as a service over a network. In particular, cloud computing may include a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Cloud computing users can access virtual computing resources (e.g., storage, data, applications, and even complete virtualized computing instances) in "the cloud," without regard for the underlying physical systems (or locations of those systems) used to provide the computing resources, and cloud computing resources are typically provided to users on a pay-per-use basis.

Traditionally, cloud computing applications have been largely limited to running in a single cloud. One limitation of coordinating multiple applications across different clouds to provide a service is data security. For example, an end user may have a data security agreement with one cloud provider and expect the user's data to be protected from viewing by third parties, including applications running in other clouds, especially those provided by other cloud providers. However, coordinating multiple applications across different clouds can expose the user's data to such applications running in other clouds.

SUMMARY

One embodiment disclosed herein provides a computer-implemented method performed by a first endpoint to transmit first and second data to a second endpoint via at least one cloud. The method generally includes receiving, from the second endpoint, a public key, and encrypting the first data using the public key. The method further includes transmitting the encrypted first data along with the second data that is not encrypted via the at least one cloud to the second endpoint. In addition, the second data that is not encrypted is processed in the at least one cloud.

Further embodiments of the present invention include a computer system configured to carry out the above method, and a non-transitory computer-readable storage medium comprising instructions that cause a computer system to carry out the above methods.

DETAILED DESCRIPTION

Embodiments disclosed herein encrypt sensitive data being transmitted from one endpoint to another endpoint through intermediary cloud(s) so that the sensitive data is not visible to the intermediary cloud(s). Double data encryption, utilizing public and private key pairs generated at the endpoints, is used to anonymize sensitive data, while other data transmitted along with the sensitive data remains unencrypted so that intermediary cloud(s) can process the unencrypted data. In an embodiment, one of the endpoints is an application running in a first cloud, the other endpoint is a web browser executing a web application, and the intermediary cloud(s) are additional cloud(s) with applications running therein that provide services to the first cloud or coordinate with the application running in the first cloud to provide a service. In such a case, the browser may generate a public and private key pair for a user session, while the application running in the first cloud may maintain its own public and private key pair. After the browser and cloud application exchange public keys, the browser uses the cloud application's public key to encrypt sensitive data in requests transmitted through intermediary cloud(s) to the cloud application. Such encrypted data is not visible to applications running in the intermediary cloud(s) and can only be decrypted by the cloud application using the private key that the cloud application holds. Similarly, the cloud application uses the public key provided by the browser to encrypt sensitive data in responses transmitted through the intermediary cloud(s), and only the browser is able to decrypt such encrypted data using the private key that the browser holds.

Figure 1:
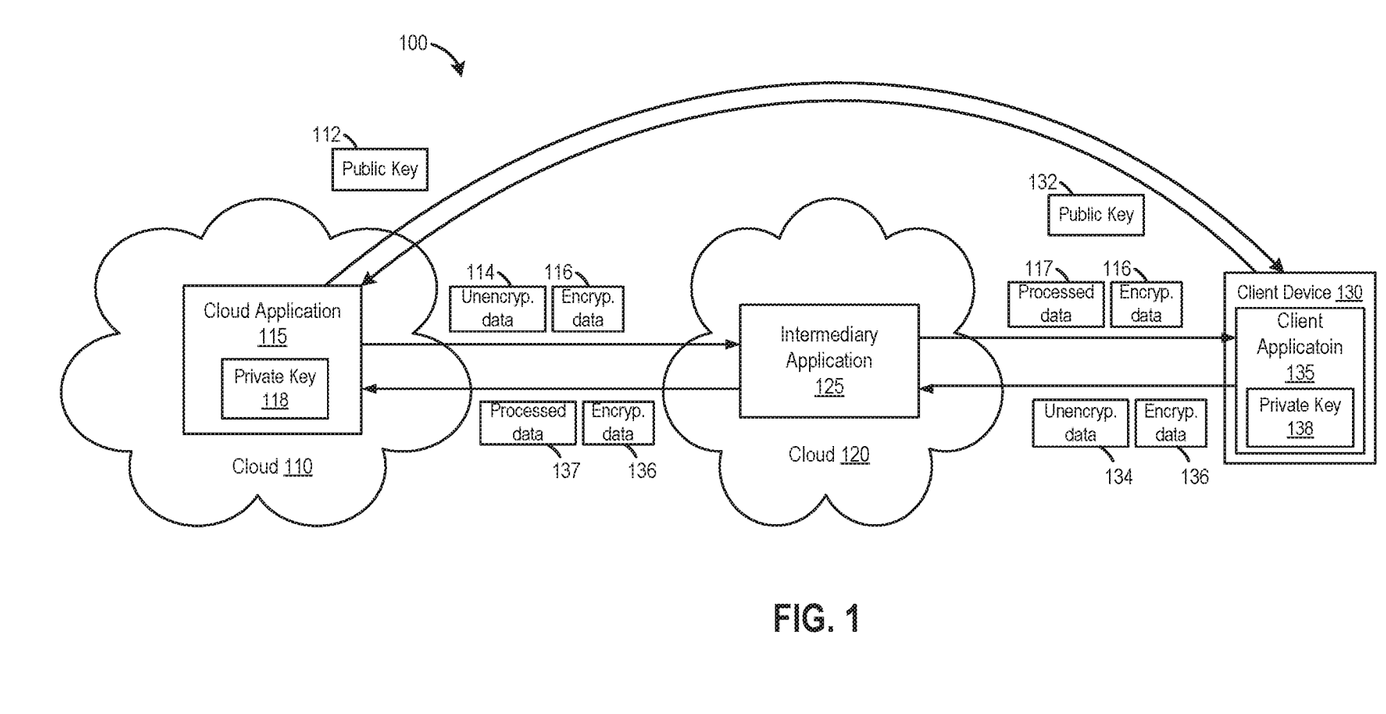
FIG. 1 illustrates an approach for shielding sensitive data from the view of intermediary cloud(s) using encryption, according to an embodiment.

FIG. 1 illustrates an approach for shielding sensitive data from the view of intermediary cloud(s) using encryption, according to an embodiment. As shown, an intermediary application 125 running in a cloud 120 lies in the data transmission path between a cloud application 115 running in another cloud 110 and a client application 135 running in a client device 130. Clouds 110 and 120 are representative of cloud computing systems including hardware infrastructure platforms upon which cloud computing environments are executed. In one embodiment, the hardware infrastructure platform may be configured to provide a virtualization environment that supports the execution of multiple virtual machines (VMs) (and/or other types of virtual computing instances such as containers) across host servers, with applications such as cloud application 115 and intermediary application 125 running in the VMs, as discussed in greater detail below with respect to FIG. 3. Although cloud application 115 that runs in cloud 110 is shown for illustrative purposes, it should be understood that, in general, any remote server may be used. Further, client device 130 may be any type of computing device capable of running client application 135, such as a mobile phone, a tablet, a desktop computer, a laptop, or the like. An example of client device 130 is discussed below with respect to FIG. 4.

Illustratively, intermediary application 125 receives unencrypted data 114 and encrypted data 116 from cloud application 115. Intermediary application 125 processes the unencrypted data 114 and sends the processed data 117 along with encrypted data 116, which is not processed by intermediary application 125, to client application 135 running in client device 130. Likewise, intermediary application 125 receives unencrypted data 134 and encrypted data 136 from client application 135, processes the unencrypted data 134, and sends the processed data 137 along with encrypted data 136 to cloud application 115. The receipt of data from cloud application 115 in cloud 110 and processing of such data by intermediary application 125 in cloud 120 is an example of multi-cloud coordination, in which multiple clouds (and, specifically, applications running therein) coordinate to provide a service and/or a service is provided by one or multiple clouds for another cloud.

For example, intermediary application 125 may be a usage metering application that determines resource (e.g., hardware and/or software) usage by tenants of cloud 110 so that providers of those resources (e.g., a cloud provider of physical and virtual computing resources such as CPU, memory, disk space, virtual machines, etc.) can charge money for the resource usage. In such a case, cloud application 115 may be a cloud provider application that sends resource usage information to the intermediary usage metering application through, e.g., an event-driven process, a polling process, and/or the like. In turn, the intermediary usage metering application may aggregate and record (e.g., in a storage) the resource usage information, and the usage metering application may further provide the resource usage information to client application 135. For example, the usage metering application may provide the aggregate CPU, memory, or storage usage by a particular enterprise or user that is requested by client application 135, which may be, e.g., a web browser executing a web application that displays information received from the usage metering application to a user. Encryption may be employed to shield the intermediary usage metering application running in intermediary cloud 120 from viewing sensitive data that may be associated and transmitted along with resource usage data. For example, the sensitive data being encrypted may include personally identifiable information (PII) of enterprises or users whose resource usage data is being metered, such as the names of such enterprises or users, the physical or e-mail addresses of the enterprises or users, user ages, and/or user genders. It is assumed that the cloud 115 and client 135 applications are trusted endpoints, but intermediary cloud 120 is not trusted. For example, the provider of intermediary cloud 120 may not have a data security agreement with the enterprise or user whose resource usage is being metered. Encryption effectively anonymizes sensitive information so that the usage metering application that is not trusted may still, e.g., aggregate and record resource usage information based on other, unencrypted data such as the universally unique identifiers (UUIDs) of enterprises and/or users associated with the resource usage information. However, the usage metering application cannot decrypt or view the sensitive information that is encrypted, such as encrypted personally identifiable information indicating who the enterprises and/or users actually are.

As shown, cloud application 115 and client application 135 exchange public keys 112 and 132 of the public and private key pairs that they maintain, and the exchanged public keys 112 and 132 are then used by client application 135 and cloud application 115, respectively, to encrypt sensitive information transmitted through intermediary cloud 120. Certificates issued by a certificate authority (not shown) may also be utilized, in order to authenticate the identities of one or both of cloud 115 and client applications 135 and guarantee that the exchanged public keys 112 and 132 are being sent by cloud 115 and client applications 135, as opposed to other entities. In asymmetrical cryptography, public and private keys are generated in pairs for encrypting and decrypting messages. Asymmetrical cryptography relies on cryptographical algorithms based on mathematical problems that are computationally difficult to solve, such as factoring certain large integers and elliptic curve relationships. The public key in a public and private key pair may be shared publicly, while the private key is kept secret by an owner. Messages may then be encrypted with the public key that only the owner of the corresponding private key can decrypt using that private key. In one embodiment, client application 135 generates the pair of public 132 and private 138 keys at the start of a user session, such as when a user logs in to or starts a web application, while cloud application 115 maintains the pair of public 112 and private 118 keys. After generating the public 132 and private 138 key pair, client application 135 transmits public key 132 to cloud application 115 and requests public key 112 from cloud application 115, which cloud application 115 provides in response to the request. Subsequently, client application 135 and cloud application 115 may use public keys 112 and 132, respectively, to encrypt sensitive data transmitted to each other through intermediary cloud 120, while not encrypting other data that intermediary application 125 needs to process. It should be understood that the structure of the data (e.g., the fields of a database record that is retrieved) may remain unchanged, even as sensitive data (e.g., specific fields) is encrypted to shield intermediary application 125 from viewing such sensitive data. In addition, when no sensitive data is being transmitted through intermediary cloud 120, then client 135 and cloud 115 applications may perform no encryption.

Continuing the usage metering example from above, client application 135 may use public key 112 to encrypt data in, e.g., requests to register enterprise(s) and/or user(s), requests for resource usage information associated with particular enterprise(s) and/or user(s), requests to establish rules in the resource usage metering, and the like that client application 135 transmits to cloud application 115 through intermediary cloud 120. As a result, only cloud application 115, which holds private key 118 corresponding to public key 112, is able to decrypt the encrypted data, while such data cannot be decrypted or viewed by intermediary application 125 (or any other application running in intermediary cloud 120). The data that is encrypted may include, e.g., personally identifiable information. For example, client application 135 may make the following request to register an enterprise or user: "add customer XXXX's resource consumption under licenseKey 2320-23302-2333." In such a case, customer XXXX may be personally identifiable information, such as an enterprise or user's name, that should be encrypted, while licenseKey 2320-23302-2333 may be left unencrypted so that intermediary application 125 can validate the licenseKey value before relaying the request to cloud application 115. As another example, client application 135 may make the following request establishing a rule for reporting resource usage information: "for region X's reported resource usage, only report consumption that lasts more than 10 minutes." In such a case, 10 minutes may be sensitive data that should be encrypted, while region X may be data that is left unencrypted so that intermediary application can validate the region value before relaying the request to cloud application 115.

Similarly, cloud application 115 may use public key 132 to encrypt some data, such as personally identifiable information, in responses that cloud application 115 sends to client application 135 through intermediary cloud 120. Other data in the responses, such as resource usage information for a particular enterprise or user identified only by UUID, may not be encrypted, allowing intermediary application 125 to process the unencrypted data, such as by aggregating and recording the resource usage information for the particular enterprise or user. As a result, multi-cloud coordination between the applications 115 and 125 running in clouds 110 and 120 is unaffected, while sensitive data can be encrypted and shielded from viewing by applications running in intermediary cloud 120.

Although one intermediary cloud 120 between cloud application 115 and client application 135 is shown for illustrative purposes in FIG. 1, it should be understood that, in other embodiments, any number of intermediary clouds may sequentially process data between any two endpoints (e.g., between a cloud and a client application, between two clouds, etc.). In yet another embodiment, one cloud may process data for another cloud and return the processed data to that cloud. In such cases, techniques similar to those disclosed herein may be applied to exchange public keys (if necessary) and encrypt sensitive data using the public keys so that intermediary cloud(s) cannot view the encrypted sensitive data passing through them. Further, it should be understood that the encryption of sensitive data according to techniques disclosed herein allows the data to be shielded from view of intermediary cloud(s) through which the encrypted data passes, unlike traditional communication security techniques such as SSL (Secure Sockets Layer), which encrypts data that is in transition inside network packets but allows the data in those packets to be decrypted once the packets reach intermediary cloud(s), thereby exposing sensitive data.

Figure 2:
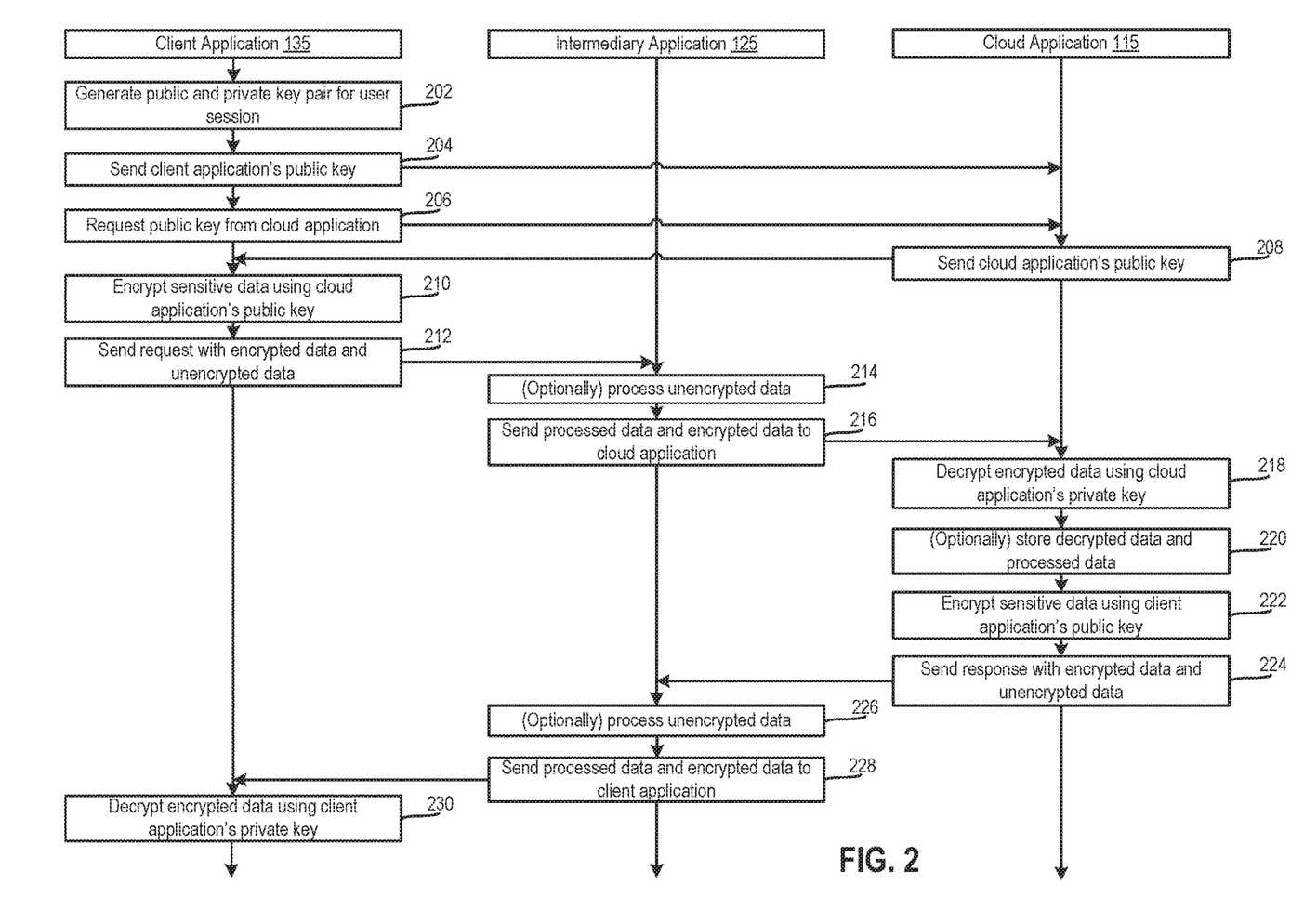
FIG. 2 illustrates a method of encrypting sensitive data transmitted through intermediary cloud(s), according to an embodiment.

FIG. 2 illustrates a method 200 of encrypting sensitive data transmitted through intermediary cloud(s), according to an embodiment. As shown, method 200 begins at step 202, where client application 135 generates a public and private key pair for a user session. In one embodiment, client application 135 may be a web browser executing a web application. In such a case, the browser may dynamically generate the public and private key pair at the start of, e.g., a user session created when a user logs in to or starts the web application. The public and private key pair that is generated for use during a user session may later be deleted when the session is terminated.

At step 204, client application 135 sends the public key generated at step 202 to cloud application 115. As described, the public key in a public and private key pair may be shared publicly and used to encrypt messages that only the holder of the corresponding private key can decrypt using that private key. After the public key generated by client application 135 is shared with cloud application 115, cloud application 115 may use the public key to encrypt data that only client application 135 can decrypt with the private key that client application 135 holds.

At step 206, client application 135 requests from cloud application 115 a public key from a public and private key pair that is maintained by cloud application 115. Then at step 208, cloud application 115 responds by sending to client application 135 the requested public key. It should be understood that the public key maintained by cloud application 115 is meant to be shared publicly and can be asked by client application 135. In contrast to the public and private keys that are dynamically generated by client application 135 for each user session, cloud application 115 may maintain a permanent public and private key pair if cloud application 115 does not ordinarily go down, unlike user sessions which may be terminated.

At step 210, client application 135 encrypts sensitive data to be transmitted, if any, using the public key received from cloud application 115 at step 208. Any suitable data may be encrypted by client 135, and the particular data that is considered sensitive and encrypted may depend on, e.g., client application 135 as well as the cloud-side application 115, user preferences, and/or contractual obligations, among other things. For example, the sensitive data that is encrypted may include personally identifiable information in a request that is to be sent to cloud application 115, while other data that intermediary application 125 understands and needs to validate may not be encrypted. Further, the structure of data may be unchanged, even as some of the data that is sensitive is encrypted. In addition, if no sensitive data is being transmitted through intermediary cloud(s), then client application 135 may not perform any encryption. In some embodiments, the sensitive data being encrypted may include personally identifiable information, such as the names of enterprises or users, the physical or e-mail addresses of enterprises or users, user ages, and/or user genders.

At step 212, client application 135 sends a request to cloud application 125 that includes the encrypted data as well as unencrypted data. In one embodiment, the request is a REST (Representational State Transfer) API (Application Programming Interface) request or a request made according to another client-server communication protocol, and the request includes both encrypted and unencrypted data. Returning to the resource usage metering example above, client application 135 may send a request to register enterprise(s) and/or user(s), to establish rules in resource usage metering, for resource usage information associated with particular enterprise(s) and/or user(s), or the like to cloud application 115 through intermediary cloud 120. Such a request may include sensitive data, such as personally-identifiable information associated with an enterprise or user, that is encrypted, as well as unencrypted data that intermediary application 125 understands and can validate or otherwise use, such as the licenseKey or region value described above, a QUID of an enterprise or user, a type of resource (e.g., a particular software or hardware resource) whose usage information is being requested, and the like.

At step 214, intermediary application 125 (optionally) processes the unencrypted data in the request. Any suitable processing may be performed by intermediary application 125 at step 214, or intermediary application 125 may perform no processing. For example, the processing may include validating the unencrypted data, such as the validating of the licenseKey and the region values described above.

At step 216, intermediary application 125 sends the processed data (assuming the unencrypted data has been processed) and the encrypted data, which intermediary application 125 does not process, to cloud application 115. Then, at step 218, cloud application 115 decrypts the encrypted data using the private key that cloud application 115 holds. It should be understood that, while intermediary application 125 is unable to decrypt and view encrypted data, cloud application 115 can use the private key it holds to decrypt the encrypted data.

At step 220, cloud application 115 (optionally) stores the decrypted data and the unencrypted data that has been processed. For example, in the case of registering an enterprise and/or user for resource usage metering described above, cloud application 115 may store the enterprise and/or user's name, as well as other information about the enterprise and/or user that is included in the registration request sent by client application 135. As another example, in the case of establishing a rule for resource usage metering, cloud application 115 may store the decrypted data and unencrypted data that is included in a request to establish the rule sent by client application 135. Where client application 135 is only requesting resource usage information associated with particular enterprise(s) and/or user(s), cloud application 115 may respond to such a request, without necessarily storing decrypted or unencrypted data that is included in the request.

At step 222, cloud application 115 encrypts sensitive data, if any, to be transmitted in response to the request from client application 135, using the public key received from client application 135 at step 204. Step 222 is akin to step 210, except cloud application 115 is encrypting sensitive data, rather than client application 135, and doing so using the public key sent by client application 135 to cloud application 115. For example, in response to a request for resource usage information associated with a particular enterprise or user, cloud application 115 may encrypt personally identifiable information associated with the enterprise or user so that such information is not viewable by intermediary application 125. More generally, any suitable data may be encrypted by cloud application 115, without changing the structure of the data, and the particular data that is considered sensitive and encrypted may depend on, e.g., the cloud application 115 and client application 135, user preferences, and/or contractual obligations, among other things. In addition, if no sensitive data is being transmitted through intermediary cloud(s), then cloud application 115 may not perform any encryption.

At step 224, cloud application 115 sends a response with the encrypted data as well as unencrypted data to intermediary application 125. Continuing the example of resource usage metering, the response from cloud application 115 may include encrypted personally identifiable information, as well as unencrypted UUID(s) and resource usage information.

At step 226, intermediary application 125 (optionally) processes the unencrypted data in the response. For example, if the unencrypted data includes UUID(s) and resource usage information as described above, intermediary application 125 may provide a service that aggregates and records the resource usage information by UUID. More generally, any suitable processing may be performed by intermediary application 125 at step 226, or intermediary application 125 may perform no processing.

At step 228, intermediary application 125 sends the processed unencrypted data (assuming the unencrypted data has been processed) and the encrypted data, which intermediary application 125 does not process, to client application 135. Then, at step 230, client application 135 decrypts the encrypted data using the private key that client application 135 holds. Similar to step 218 above, only client application 135 holds the private key needed to decrypt data that is encrypted with the public key provided by client application 135, and the encrypted data is not viewable when being passed through intermediary cloud 120.

Figure 3:
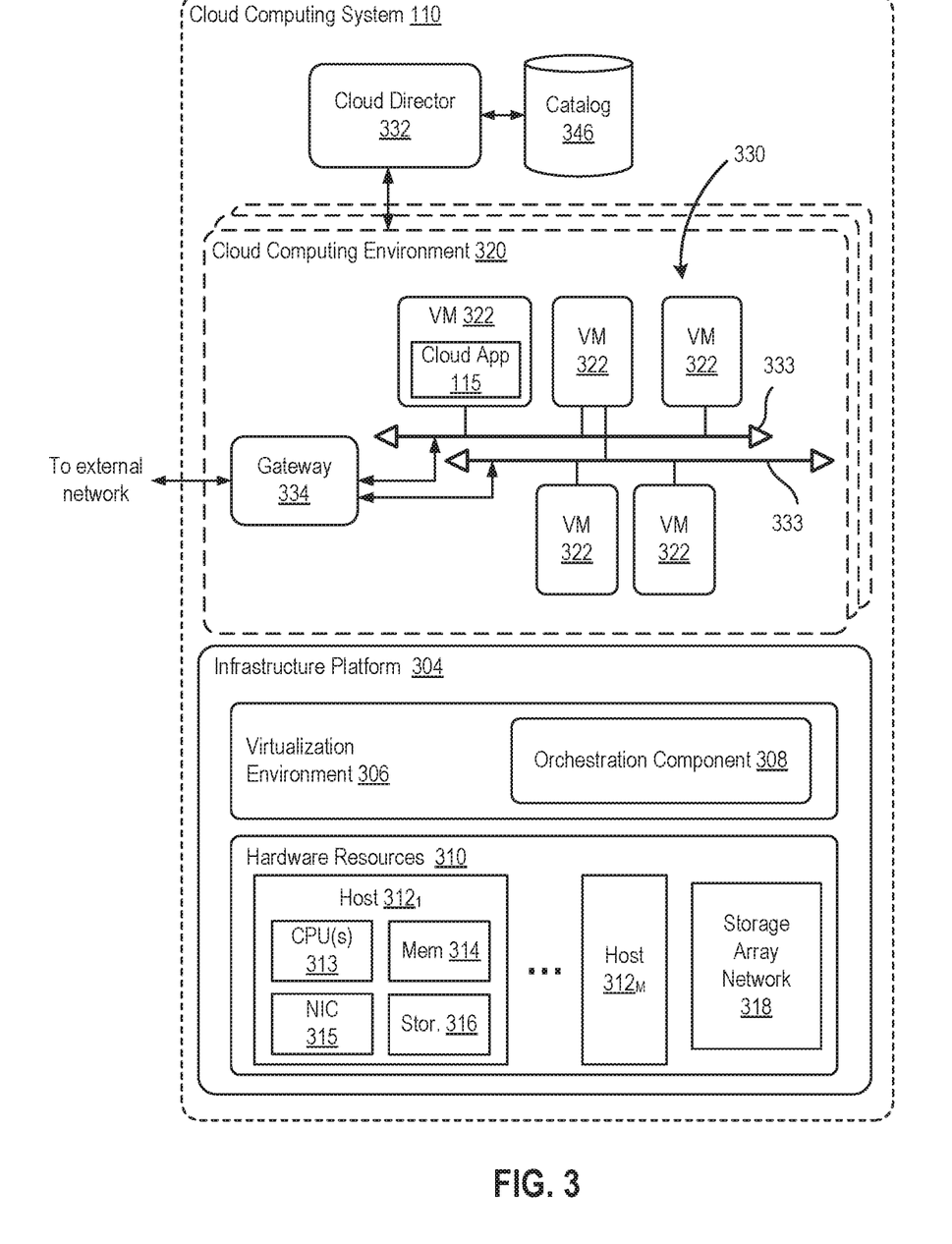
FIG. 3 illustrates components of a cloud computing system, according to an embodiment.

FIG. 3 illustrates components of cloud computing system 110 in which a cloud application such as application 115 may run, according to an embodiment. Cloud computing system 110 may either be a "private" cloud in which a tenant and a cloud service provider are part of the same organization, or cloud computing system 110 may be an external or "public" cloud that is provided by an organization that is separate from tenant(s) that access the external cloud. For example, one tenant may be part of an enterprise, and the external cloud may be part of a cloud service provider that is separate from the enterprise of the tenant and that provides cloud services to different enterprises and/or individuals. Although FIG. 3 illustrates in greater detail cloud 110 from FIG. 1, it should be understood that the functional components of intermediary cloud 120 may be similar to those of cloud 110.

In one or more embodiments, cloud computing system 110 is configured to dynamically provide an enterprise (or users of an enterprise) with one or more virtual data centers 320 in which a user may provision VMs 322 (and/or other virtual computing instances such as containers), deploy multi-tier applications on VMs 322, and/or execute workloads. Cloud computing system 110 includes an infrastructure platform 304 upon which a cloud computing environment 320 may be executed. In the particular embodiment of FIG. 3, infrastructure platform 304 includes hardware resources 310 having computing resources (e.g., hosts $312_1$ to $312_N$), storage resources (e.g., one or more storage array systems, such as SAN 318), and networking resources, which are configured in a manner to provide a virtualization environment 306 that supports the execution of a plurality of virtual machines 322 across hosts 312. It should be understood that hardware resources 310 of cloud data center 110 may in some embodiments be distributed across multiple data centers in different locations.

Hosts 312 may each be constructed on a server grade hardware platform, such as an x86 architecture platform. As shown, the hardware platform of each host 312 may include components of a computing device, such as one or more processor(s) (shown as CPU(s)) 313, system memory 314, a network interface 315, storage system 316, and other I/O devices such as, for example, a mouse and keyboard (not shown). CPU(s) 313 are configured to execute instructions, for example, executable instructions that perform one or more operations described herein and may be stored in memory 314 and in local storage. Although shown as being CPU(s) 313, it should be understood that the hardware platform of host 312 may generally include general purpose processor(s) and optional special purpose processor(s) for processing video data, audio data, or other types of data. For example, the processor(s) may include a single CPU, multiple CPUs, a single CPU having multiple processing cores, one or more graphical processing units (GPUS), one or more FPGA (field-programmable gate array) cards, or a combination of these. Memory 314 is a device allowing information, such as executable instructions, virtual disks, configurations, and other data, to be stored and retrieved. Memory 314 may include, for example, one or more random access memory (RAM) modules. Network interface 315 enables host 312 to communicate with another device via a communication medium, such as a network within cloud data center 110. Network interface 315 may be one or more network adapters, also referred to as Network Interface Cards (NICs). Storage 316 represents local storage devices (e.g., one or more hard disks, flash memory modules, solid state disks, or optical disks) and/or a storage interface that enables host 312 to communicate with one or more network data storage systems. Examples of a storage interface are a host bus adapter (HBA) that couples host 312 to one or more storage arrays, such as a storage area network (SAN) or a network-attached storage (NAS), as well as other network data storage systems.

Each host 312 is configured to provide a virtualization layer that abstracts processor, memory, storage, and networking resources of its hardware platform into multiple virtual machines (e.g., one or more of VMs 322) that run concurrently on the same hosts. VMs run on top of a software interface layer, also referred to herein as a hypervisor, that enables sharing of the hardware resources of host 312 by the VMs. One example of a hypervisor that may be used in an embodiment described herein is a VMware ESXi™ hypervisor provided as part of the VMware vSphere® solution made commercially available from VMware, Inc. of Palo Alto, Calif. The hypervisor may run on top of the operating system of host 312 or directly on hardware components of host 312.

Each cloud computing environment 320 may be associated with a particular tenant of cloud data center 110. In one embodiment, cloud computing environment 320 may be configured as a dedicated cloud service for a single tenant comprised of dedicated hardware resources (i.e., physically isolated from hardware resources used by other users of cloud computing system 110). In other embodiments, cloud computing environment 320 may be configured as a multi-tenant cloud service with logically isolated virtualized computing resources on a shared physical infrastructure. It is recognized that cloud computing system 110 may support multiple cloud computing environments 320, available to multiple enterprises in single-tenant and multi-tenant configurations.

As shown, virtualization environment 306 includes an orchestration component 308 (e.g., implemented as a process running in a VM) that provides infrastructure resources to cloud computing environment 320 responsive to provisioning requests. For example, if an enterprise required a specified number of virtual machines to deploy web applications or to modify (e.g., scale) a currently running web application to support peak demands, orchestration component 308 can initiate and manage the instantiation of virtual machines (e.g., VMs 322) on hosts 312 to support such requests. In one embodiment, orchestration component 308 instantiates virtual machines according to a requested template that defines one or more virtual machines having specified virtual computing resources (e.g., compute, networking, storage resources). Further, orchestration component 308 monitors the infrastructure resource consumption levels and requirements of cloud computing environment 320 and provides additional infrastructure resources to cloud computing environment 320 as needed or desired. In one example, virtualization environment 306 may be implemented by running on hosts 312 VMware ESX™ based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 110 may include a cloud director 332 (e.g., run in one or more virtual machines) that manages allocation of virtual computing resources to an enterprise for deploying applications. Cloud director 332 may be accessible to users via a REST API or any other client-server communication protocol. Cloud director 332 may authenticate connection attempts from the enterprise using credentials issued by the cloud computing provider. Cloud director 332 maintains and publishes a catalog 346 of available virtual machine templates and virtual machine packages that represent virtual machines that may be provisioned in cloud computing environment 320. A virtual machine template is a virtual machine image that is loaded with a pre-installed guest operating system, applications, and data, and is typically used to repeatedly create a VM having the pre-defined configuration. A virtual machine package is a logical container of one or more pre-configured virtual machines that package applications and parameters that define operational details of the package. An example of a VM package is vApp™ technology made available by VMware, Inc., of Palo Alto, Calif., although other technologies may be utilized. Cloud director 332 receives provisioning requests that are submitted (e.g., via REST API calls) and may propagate such requests to orchestration component 308 to instantiate the requested virtual machines (e.g., VMs 322).

Cloud computing environment 320 may support the creation of a virtual data center having a plurality of virtual machines 322 instantiated to, for example, host deployed multi-tier applications. A virtual data center is a logical construct that provides compute, network, and storage resources to an organization. Virtual data centers provide an environment where VMs 322 can be created, stored, and operated, enabling complete abstraction between the consumption of infrastructure service and underlying resources. As described, VMs 322 may be configured as abstractions of processor, memory, storage, and networking resources of hardware resources 310. The virtual data center may include one or more virtual networks, shown as virtual networks 333, used to communicate between VMs 322 and managed by at least one networking gateway component (e.g., gateway 334), as well as one or more isolated internal networks (not shown) that are not connected to gateway 334. Gateway 334 (e.g., executing as a virtual machine) is configured to provide VMs 322 and other components in cloud computing environment 320 with connectivity to an external network (e.g., the Internet). Gateway 334 manages external public IP addresses for the virtual data center and one or more private internal networks interconnecting VMs 322. Gateway 334 is configured to route traffic incoming to and outgoing from the virtual data center and provide networking services, such as firewalls, network address translation (NAT), dynamic host configuration protocol (DHCP), and load balancing.

As shown, cloud application 115 runs in one of the VMs 322 in cloud computing environment 320. Cloud application 115 is configured to coordinate with application(s) running in other cloud(s) (e.g., intermediary application 120) to provide a service and/or service(s) are provided by those application(s) running in other cloud(s) for cloud application 115. For example, cloud application 115 may be a cloud provider application that sends resource usage information to a usage metering application running in intermediary cloud 120, and the usage metering application may aggregate and record such resource usage information. In one embodiment, in order to shield sensitive data from the view of applications such as intermediary application 125 running in intermediary clouds, cloud application 115 may be configured to receive a public key from client application 135 and to send to client application 135 a public key maintained by cloud application 115 in response to a request from client application 135. Thereafter, cloud application 115 uses a private key it maintains to decrypt data that is encrypted in requests from client application 135 and stores such data after decryption, and cloud application 115 further uses the public key received from client application 135 to encrypt sensitive data that is sent along with unencrypted data that intermediary application 125 processes, according to steps 204-208 and 218-224 of method 200, described above.

Figure 4:
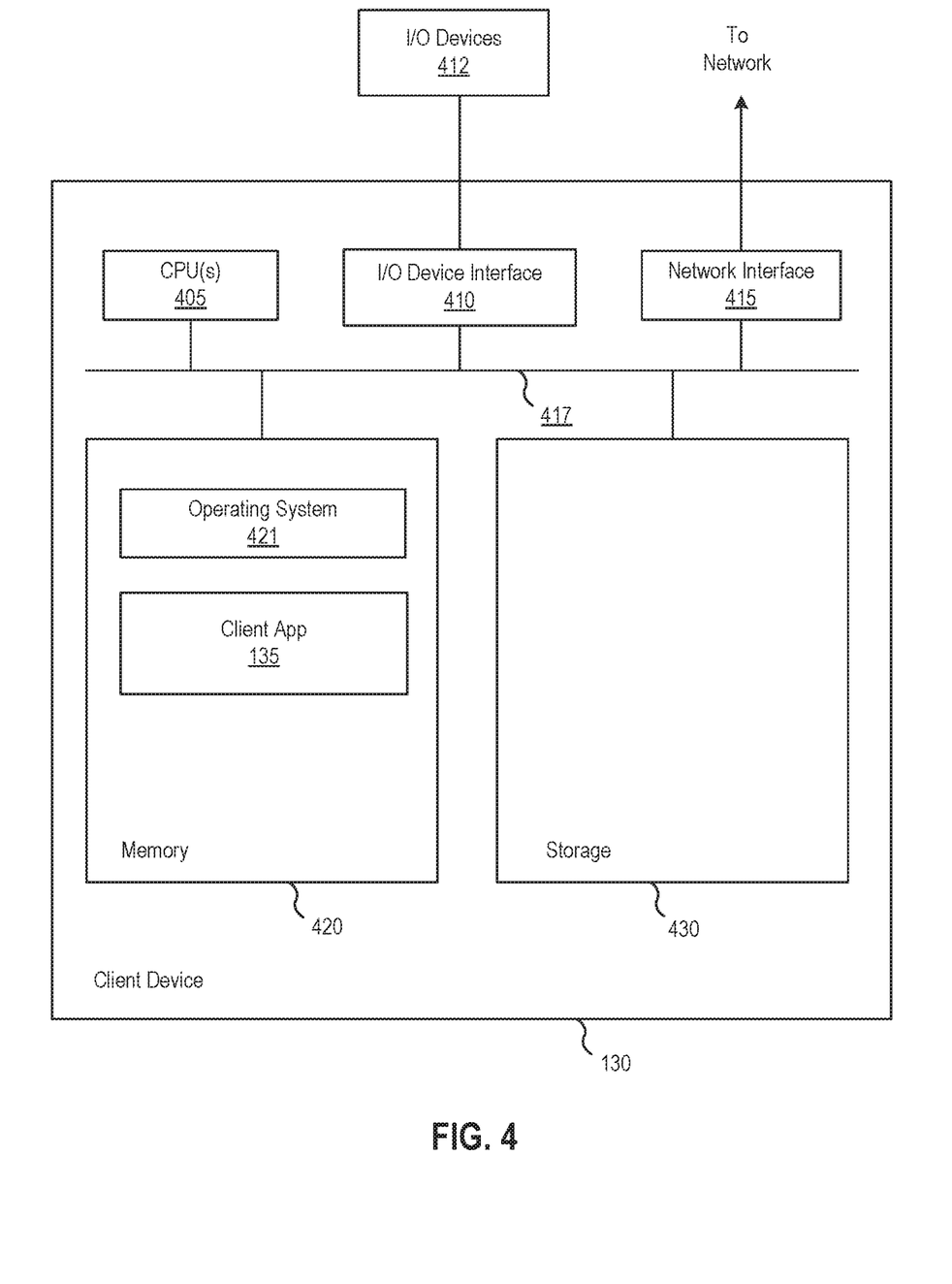
FIG. 4 illustrates a computing device in which a client application may run, according to an embodiment.

FIG. 4 illustrates an example of client computing device 130 in which client application 135 may run, according to an embodiment. As shown, client device 130 includes processor(s), shown as CPU(s) 405, a network interface 415 connecting computer client device 130 to a network, a memory 420, and storage 430, which are similar to CPU(s) 313, system memory 314, network interface 315, and storage system 316, respectively, of host 312 that are discussed above, and will not be described in detail herein for conciseness. Client device 130 also includes an I/O device interface 410 connecting I/O devices (e.g., keyboard, display and mouse devices) to computer client device 130, as well as an interconnect 417 that facilitates transmission, such of programming instructions and application data, between CPU(s) 405, I/O device interface 410, storage 460, network interface 415, and memory 420.

As shown, memory 420 includes an operating system 421 and client application 135. The operating system 421 may be, e.g., Windows® or Linux®. Client application 135 may be, e.g., a web browser executing a web application which is configured to send requests to cloud application 115 including unencrypted data that is processed by application(s) running in intermediary cloud(s) as well as encrypted data that is shielded from viewing by those intermediary application(s). In one embodiment, client application 135 may generate a public and private key pair for a user session, send the generated public key to cloud application 115, request and receive cloud application's 115 public key, use the received public key to encrypt sensitive data that is transmitted in requests to cloud application 115 along with unencrypted data, and use the private key that client application 135 generated and holds to decrypt data that is encrypted using the client application's 135 public key in responses received from cloud application 115, according to steps 202-206, 210-212, and 230 of method 200, described above.

Advantageously, techniques disclosed herein prevent sensitive data from being viewed by intermediary cloud application(s) in multi-cloud coordination scenarios. Public keys exchanged by two endpoints are used to encrypt sensitive data transmitted through intermediary cloud(s) while leaving other data unencrypted. As a result, applications that run in the intermediary cloud(s) can process the unencrypted data, but cannot decrypt and view the sensitive data. By shielding sensitive data from the view of intermediary cloud(s) through which the sensitive data passes, techniques disclosed herein improve over traditional communication security techniques such as SSL, which encrypts data in transition inside network packets but allows such data to be decrypted and viewed once those packets reach the intermediary cloud(s).

The various embodiments described herein may employ various computer-implemented operations involving data stored in computer systems. For example, these operations may require physical manipulation of physical quantities usually, though not necessarily, these quantities may take the form of electrical or magnetic signals where they, or representations of them, are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs), CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments, implemented as hosted embodiments, non-hosted embodiments, or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Certain embodiments as described above involve a hardware abstraction layer on top of a host computer. The hardware abstraction layer allows multiple contexts or virtual computing instances to share the hardware resource. In one embodiment, these virtual computing instances are isolated from each other, each having at least a user application running therein. The hardware abstraction layer thus provides benefits of resource isolation and allocation among the virtual computing instances. In the foregoing embodiments, virtual machines are used as an example for the virtual computing instances and hypervisors as an example for the hardware abstraction layer. As described above, each virtual machine includes a guest operating system in which at least one application runs. It should be noted that these embodiments may also apply to other examples of virtual computing instances, such as containers not including a guest operation system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claims(s).

What is claimed is:

1. A computer-implemented method performed by a first endpoint to transmit first and second data to a second endpoint via at least one cloud, the method comprising:
    receiving, from the second endpoint, a first public key, wherein the first endpoint is an application running in a cloud and the second endpoint is a client application, wherein the first public key is from a public and private key pair dynamically generated by the client application for a user session;
    encrypting the first data using the first public key; and
    transmitting the encrypted first data along with the second data that is not encrypted via the at least one cloud to the second endpoint,
    wherein the second data that is not encrypted is processed in the at least one cloud.

2. The method of claim 1, wherein the first data includes personally identifiable information.

3. The method of claim 2, wherein the personally identifiable information includes at least one of a name of a user, a name of an enterprise, a physical address of a user, a physical address of an enterprise, an e-mail address of a user, an e-mail address of an enterprise, a user age, or a user gender.

4. The method of claim 1, wherein: the second data includes resource usage information; and
    the processing of the second data in the at least one cloud includes at least one of aggregating or recording the resource usage information.

5. The method of claim 1, wherein the processing of the second data in the at least one cloud includes validating the second data.

6. The method of claim 1, wherein the client application comprises a web browser executing in a web application.

7. The method of claim 1, further comprising:
    transmitting a second public key to the second endpoint;
    receiving encrypted third data transmitted by the second endpoint via the at least one cloud; and
    decrypting the encrypted third data using a private key associated with the second public key,
    wherein the encrypted third data is transmitted along with fourth data that is not encrypted and is processed in the at least one cloud.

8. The method of claim 7, further comprising:
    generating and maintaining the second public key and the associated private key,
    wherein the second public key is transmitted to the second endpoint in response to a request from the second endpoint.

9. The method of claim 1, further comprising, requesting, from the second endpoint, the first public key.

10. A non-transitory computer-readable storage medium storing instructions, which when executed by a computer system, cause the computer system to perform operations for a first endpoint to transmit first and second data to a second endpoint via at least one cloud, the operations comprising:
    receiving, from the second endpoint, a first public key, wherein the first endpoint is an application running in a cloud and the second endpoint is a client application, wherein the first public key is from a public and private key pair dynamically generated by the client application for a user session;
    encrypting the first data using the first public key; and
    transmitting the encrypted first data along with the second data that is not encrypted via the at least one cloud to the second endpoint,
    wherein the second data that is not encrypted is processed in the at least one cloud.

11. The computer-readable storage medium of claim 10, wherein the first data includes personally identifiable information.

12. The computer-readable storage medium of claim 11, wherein the personally identifiable information includes at least one of a name of a user, a name of an enterprise, a physical address of a user, a physical address of an enterprise, an e-mail address of a user, an e-mail address of an enterprise, a user age, or a user gender.

13. The computer-readable storage medium of claim 10, wherein:
    the second data includes resource usage information; and
    the processing of the second data in the at least one cloud includes at least one of aggregating or recording the resource usage information.

14. The computer-readable storage medium of claim 10, wherein the processing of the second data in the at least one cloud includes validating the second data.

15. The computer-readable storage medium of claim 10, wherein the client application comprises a web browser executing a web application.

16. The computer-readable storage medium of claim 10, the operations further comprising:
    transmitting a second public key to the second endpoint;
    receiving encrypted third data transmitted by the second endpoint via the at least one cloud; and
    decrypting the encrypted third data using a private key associated with the second public key,
    wherein the encrypted third data is transmitted along with fourth data that is not encrypted and is processed in the at least one cloud.

17. The computer-readable storage medium of claim 16, the operations further comprising:
    generating and maintaining the second public key and the associated private key, wherein the second public key is transmitted to the second endpoint in response to a request from the second endpoint.

18. A system, comprising:

a processor; and a memory, wherein the memory includes an application program configured to perform operations for a first endpoint to transmit first and second data to a second endpoint via at least one cloud, the operations comprising:

receiving, from the second endpoint, a first public key, wherein the first endpoint is an application running in a cloud and the second endpoint is a client application, wherein the first public key is from a public and private key pair dynamically generated by the client application for a user session, encrypting the first data using the first public key, and transmitting the encrypted first data along with the second data that is not encrypted via the at least one cloud to the second endpoint, wherein the second data that is not encrypted is processed in the at least one cloud.

\* \* \* \* \*